United States Patent [19]
Gordon

[11] Patent Number: 5,631,065
[45] Date of Patent: May 20, 1997

[54] WINDOW COATING WITH LOW HAZE

[76] Inventor: Roy G. Gordon, 22 Highland St., Cambridge, Mass. 02138

[21] Appl. No.: 682,185

[22] Filed: Apr. 8, 1991

[51] Int. Cl.⁶ .................................. B32B 3/00; B05D 5/12
[52] U.S. Cl. .................. 428/172; 428/161; 428/164; 428/427; 428/428; 428/432; 428/433; 428/434; 428/148; 428/697; 428/701; 428/702; 428/704; 427/126.2; 427/126.3; 427/258; 427/269; 427/287; 427/376.2; 427/419.2
[58] Field of Search ................. 428/212, 702, 428/172, 156, 432, 433, 434, 689, 161, 164, 409, 410, 427, 428, 697, 701, 908.8, 148, 704; 427/126.1, 126.2, 258, 265, 126.3, 266, 269, 287, 376.2, 419.2, 419.3

[56] References Cited

U.S. PATENT DOCUMENTS

| | | | |
|---|---|---|---|
| 3,922,471 | 11/1975 | Ellis | 428/427 |
| 4,106,859 | 8/1978 | Doriguzzi et al. | 428/1 |
| 4,378,409 | 3/1983 | Wahlers et al. | 428/432 |
| 4,381,333 | 4/1983 | Beggs et al. | 428/312.6 |
| 4,421,580 | 12/1983 | Dembicki et al. | 156/69 |
| 4,904,526 | 2/1990 | Koskenmaki | 428/328 |

*Primary Examiner*—Donald Loney
*Attorney, Agent, or Firm*—Samuels, Gauthier, Stevens & Reppert

[57] ABSTRACT

A durable energy-conserving window glass is produced with very low scattering of visible light. A typical structure consists of soda-lime glass coated successively with alumina, then fluorine-doped tin oxide and finally with bismuth silicate glass. The whole structure is heated so that the bismuth silicate glass softens and flows to form a smooth surface.

15 Claims, 1 Drawing Sheet

WINDOW COATING WITH LOW HAZE

BACKGROUND OF THE INVENTION

This invention is directed toward producing inorganic coatings with reduced light scattering or haze. More particularly, it is directed to producing energy-conserving windows with clearer transmission of light and less scattering of light.

It is well known in the art to produce coatings on window glass that reduce the flow of heat through the window. These "low-emissivity" coatings reduce the emission of infrared heat rays from the coated surface of the window. The coatings contain either a metal such as silver, or a semiconductor such as fluorine-doped tin oxide. The metal coatings ("soft coats") have good optical properties and show little haze, but they are not durable to abrasion, or to exposure to air or moisture. The semiconductor coatings ("hard coats") are mechanically and chemically extremely durable, but tend to show more haze.

Haze is measured by instruments which detect light which is transmitted through the coated sheet, but is deflected by more than a few degrees from the original direction of the light. Coated glass with haze values of more than about one percent may be considered objectionable for windows. Under special viewing conditions (bright light, dark background) haze may be seen on coated glass with haze values of even less than one percent.

Among the mechanisms that produce haze in a coating, are irregularities at either of the surfaces of the coating, or voids within the coating. Roughness on the outer surface of the coating has sometimes been reduced by polishing, but this adds a difficult step to the manufacturing process. Irregularities at the glass-tin oxide interface are sometimes introduced by reactions producing salt crystals from sodium in the glass combining with elements such as chlorine contained within the chemical precursors used to form the tin oxide. Such salt crystals can be avoided by first depositing on the glass a layer such as silica or alumina which inhibits diffusion of sodium.

A great deal of effort has gone into reducing the light scattering or haze of commercially-produced tin oxide coatings on glass, and products are now produced with haze values below one percent. However, it is considered important to reduce haze values still further.

SUMMARY OF THE INVENTION

An object of the invention is to reduce light scattering from the rough surface of a coated transparent sheet by coating the rough surface with a thin layer of transparent glass having a refractive index nearly matching that of the rough surface and heating the structure to a temperature sufficiently high and for a sufficiently long time that the glass layer flows, to form a smooth surface.

Another object of this invention is to reduce or eliminate the tendency of tin-oxide coatings to form visible marks when they are rubbed or abraded by other materials such as metals or plastics.

A further object of the invention is to reduce the amount of ultraviolet light passing through the coated transparent sheet.

Broadly my invention is a transparent glass structure comprising a transparent glass sheet, a low-emissivity coating on at least one side of said transparent sheet, said coating having an outer roughened surface coated with a protective transparent glass layer. The glass layer is coated over the low-emissivity coating and has a smooth outer surface. This glass layer has a refractive index substantially equal to the refractive index of the low-emissivity coating and reduces the appearance of haze. The layer also provides mechanical and chemical resistance and further reduces the transmission of ultraviolet light passing through the structure.

My invention also embodies a method of producing the transparent glass structure which method includes coating the roughened surface of the low-emissivity coating with a glass layer, the layer comprising oxides of metals selected from the group consisting of bismuth and lead combined with oxides of elements selected from the group consisting of silicon and boron. The coating is applied at a temperature sufficient to cause the glass layer to flow into and fill the irregularities in the low-emissivity surface and is in an amount sufficient to form a smooth outer surface.

Tin oxide films have a refractive index typically between 1.9 and 2.0. Therefore, glass with a high refractive index is needed to carry out the invention just described. The glass must also have a low enough softening temperature so that it can be caused to flow without damaging the tin oxide coating or the glass substrate underneath. Furthermore, the glass overcoating must be mechanically durable and chemically stable.

I have discovered that certain glasses meet all these requirements. They comprise oxides of metals selected from the group consisting of bismuth and lead, combined with oxides of elements selected from the group consisting of silicon and boron. By selecting suitable compositions, these glasses can be made to have a refractive index between 1.9 and 2.0. Increasing the content of bismuth and lead increases the refractive index, while increasing the content of silicon and boron decreases the refractive index, so adjustments can readily be made to find glasses with suitable refractive index.

These glass compositions are transparent and mechanically hard and durable. They are also chemically resistant to water and normal cleaning agents for glass, provided the compositions do not contain too high proportions of boron or lead, e.g. not more than about 25 mole percent of the metals.

These glass compositions can be deposited in thin layers by any convenient means known in the art, such as vacuum evaporation, sputtering, dip-coating or chemical vapor deposition.

A further benefit of these glass compositions is that they absorb ultraviolet light strongly, so that a coated glass window shields the interior of a building or automobile from damaging ultraviolet-induced damage such as fading of colors or embrittlement of plastics.

DESCRIPTION OF THE PREFERRED EMBODIMENT(S)

Figure 1:
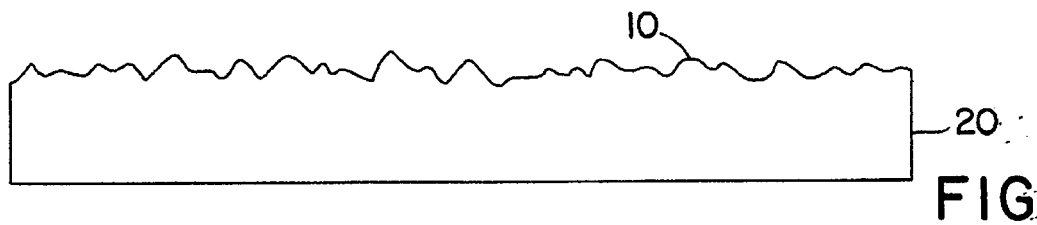
FIG. 1 is a schematic cross section of an object with a rough surface which scatters light.

Referring more particularly to FIG. 1, light incident on the surface 10 of object 20 is reflected or scattered in various directions. Such a surface is conventionally described as matte or hazy, when the scale of the roughness is so small that the individual structures cannot be seen without the aid of a microscope.

Figure 2:
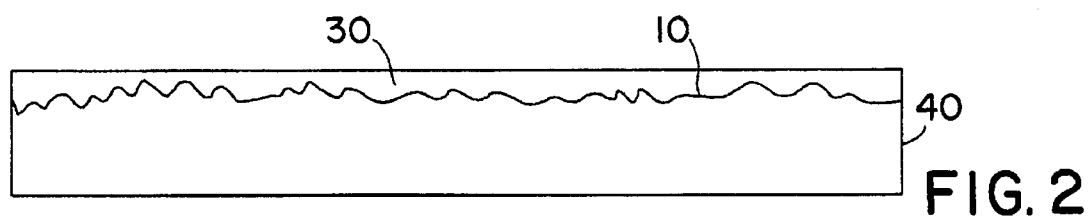
FIG. 2 is a schematic cross section of an object coated according to the invention, which scatters less light than the uncoated object in FIG. 1.

By covering such a rough surface 10 with a smooth layer of a material 30 having identical optical properties (that is, having identical refractive index and extinction coefficient), the structure 40 shown in FIG. 2 is obtained, which reflects light only in the specular direction. Such a structure 40 is conventionally described as glossy and lacking haze.

Figure 3:
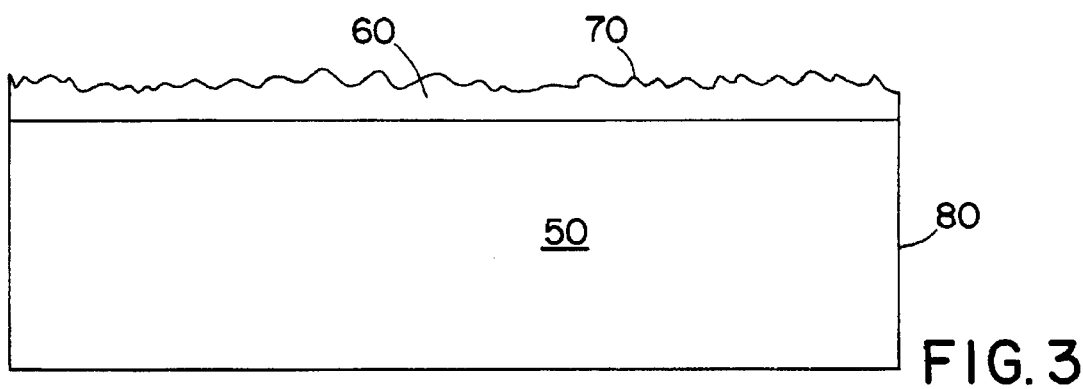
FIG. 3 is a schematic cross section of a glass sheet coated with a rough polycrystalline coating which scatters light mainly from its surface.

FIG. 3 shows a schematic cross section of a glass sheet 50 coated with a polycrystalline material 60, such as fluorine-doped tin oxide, having a rough outer surface 70. Such an object 80 appears hazy, mainly by scattering of light from its surface, as in the case of the object 20 in FIG. 1.

Figure 4:
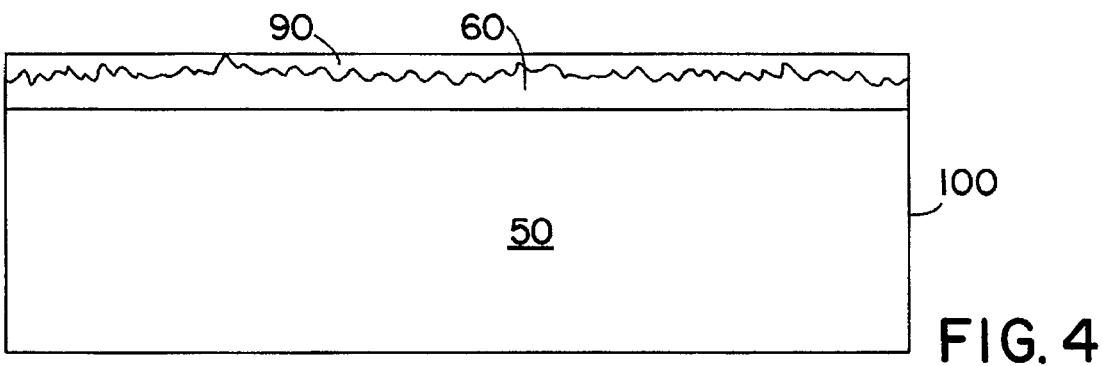
FIG. 4 is a schematic cross section of a glass sheet coated with a rough polycrystalline coating and a glass overcoating according to the invention, which scatters less light than the sheet in FIG. 3.

When a smooth glass layer 90, such as bismuth silicate, is coated on the outer surface of the hazy glass coating of FIG. 3, one obtains the structure 100 in FIG. 4. If the optical constants of the glass layer 90 and the polycrystalline coating 60 are closely matched, then the object 100 appears to have little or no haze.

EXAMPLE 1

A soda-lime window glass sheet is first coated with a thin layer of alumina about 0.07 micrometer thick by the following procedure: The glass is heated to about 450° C. and exposed to vapors of aluminum isopropoxide in dry air for about 10 seconds. The alumina layer serves as a diffusion barrier to keep the sodium in the glass from interacting with layers to be deposited subsequently. It also suppresses the interference colors of the subsequent layers.

Next the alumina-coated glass is further coated with a polycrystalline layer of fluorine-doped tin oxide about 0.3 micrometers thick, by the following procedure: The glass is heated to about 600° C. and contacted by a vapor mixture containing 2 mole percent dimethyltin dichloride, 4 mole percent bromotrifluoromethane and the balance air, for about 10 seconds.

This coated glass has the following properties: 1 percent haze, room temperature emissivity 0.18, electrical sheet resistance 20 ohms per square, and visible transmission 82 percent.

Finally the alumina- and tin oxide-coated glass sheet is coated with a layer of bismuth silicate glass about 0.1 micrometer thick by the following procedure: Bismuth neodecanoate is dissolved in ethanol to form a solution containing 0.2 moles of bismuth per liter. To this solution is added 0.2 moles per liter of di-t- butoxydiacetoxysilane. The solution is stirred for a few minutes until it appears to be a homogeneous, clear, light yellow solution. The alumina- and tin oxide-coated glass sheet is dipped in the solution and withdrawn upwardly out of the solution at a uniform rate of 1.0 millimeter per second. This dip-coated sheet is allowed to stand for 24 hours in air at about room temperature 20° C. and at about 50 percent relative humidity in order to hydrolyze the reactants. Then the sheet is placed in an oven at about 70° C. for 3 hours, after which the dip-coating is no longer tacky to the touch, i.e. it is dimensionally stable, but it is still fragile. Finally, the sheet is heated in an oven to about 600° C. for 15 minutes, and then cooled slowly to room temperature. The bismuth silicate glass coating has now hardened or set. The unwanted bismuth silicate glass coating on the opposite side of the glass from the tin oxide is removed from the glass by washing the back surface for a few seconds with a dilute (1 percent) solution of hydrofluoric acid in water.

The properties of the glass sheet coated with alumina, tin oxide and bismuth silicate are as follows: The haze is reduced to 0.2 percent, the visible transmission is reduced to 80 percent, the ultraviolet transmission is reduced to 10 percent, the emissivity is unchanged at 0.18 and the electrical sheet resistance is unchanged at 20 ohms per square.

When this coated sheet is rubbed with a piece of aluminum metal, no visible change is seen. A control piece of tin oxide coated glass rubbed in the same way shows dark marks which consist of aluminum metal abraded by the rough surface of the tin oxide.

EXAMPLE 2

Example 1 is repeated, except that tri-n-butyl borate is substituted for half of the moles of di-t-butoxydiacetoxysilane. The resulting bismuth borosilicate glass coating produced results similar to those of Example 1.

EXAMPLE 3

Example 1 is repeated, with the substitution of lead 2-ethylhexanoate for the bismuth neodecanoate. The resulting lead silicate glass coating produced results similar to those of Example 1.

EXAMPLE 4

A glass plate is coated with alumina and then with fluorine-doped tin oxide as in Example 1. Then the sheet is further coated with bismuth silicate glass by chemical vapor deposition as follows: The sheet is heated to 640° C. while floating in liquid tin metal. The sheet is contacted with a vapor mixture containing 0.3 mole percent triphenylbismuth, 0.3 mole percent dichlorosilane, 60 mole percent oxygen and balance nitrogen. Similar properties to Example 1 are obtained.

EXAMPLE 5

A glass plate is coated with alumina and then with fluorine-doped tin oxide as in Example 1. Then the sheet is further coated with bismuth silicate glass by chemical vapor deposition as follows: The sheet is heated to 640° C. while floating in liquid tin metal. The sheet is contacted with a vapor mixture containing 0.3 mole percent trimethylbismuth, 0.3 mole percent silane, 30 mole percent nitrous oxide, balance nitrogen. Similar properties to Example 1 are obtained.

EXAMPLE 6

A glass plate is coated with alumina and then with fluorine-doped tin oxide as in Example 1. Then the sheet is further coated with bismuth silicate glass by chemical vapor deposition as follows: The sheet is heated to 640° C. while floating in liquid tin metal. The sheet is contacted with a vapor mixture containing 0.3 mole percent triethylsiloxy bismuth di-tertiarybutoxide, 20 mole percent oxygen, balance nitrogen. Similar properties to Example 1 are obtained.

The average thickness of the glass layers of Examples 2–6 is between about 0.05–0.2 micrometers, say about 0.1 micrometer.

Although several embodiments of the present invention have been described and illustrated, it will be apparent to those skilled in the art that various changes and modifications may be made therein without departing from the spirit of the invention or from the scope of the appended claims.

Having described my invention, what I now claim is:

1. In a structure comprising a transparent sheet with a rough transparent coating on at least one surface of said sheet, the improvement wherein:

said rough coating is itself coated with a transparent glass layer having a refractive index substantially equal to the refractive index of said rough coating, the transparent coating having a smooth outer surface, the structure exhibiting reduced haze, enhanced abrasion resistance in reference to the structure without said glass coating and reduced ultraviolet transmission.

2. The structure of claim 1, wherein said glass layer comprises oxides of at least one element selected from the group consisting of bismuth and lead, and oxides of at least one element selected from the group consisting of silicon and boron.

3. The structure of claim 2, wherein said glass layer comprises bismuth silicate glass.

4. The structure of claim 2, wherein said glass layer comprises bismuth borosilicate glass.

5. The structure of claim 2, wherein said glass layer comprises lead silicate glass.

6. The structure of claim 2, wherein the rough coating comprises fluorine-doped tin oxide.

7. The structure of claims 2, 3, 4, 5 or 6 wherein the transparent sheet comprises soda-lime glass.

8. In a method for producing a transparent glass structure, the structure comprising a transparent sheet with a rough transparent coating on at least one surface of the sheet, the structure exhibiting haze when viewed, the improvement which comprises:

coating a layer of glass on said rough transparent coating, the glass layer having a refractive index substantially equal to the refractive index of said rough coating, the glass layer flowing into and filling the roughened surface and forming a smooth outer surface whereby the haze of said structure is reduced, an enhanced abrasion resistance is imparted to said structure and ultraviolet transmission is reduced.

9. The method of claim 8, wherein said glass layer comprises oxides of at least one element selected from the group consisting of bismuth and lead, and oxides of at least one element selected from the group consisting of silicon and boron.

10. The method of claim 9, wherein said glass layer comprises bismuth silicate glass.

11. The method of claim 9, wherein said glass layer comprises bismuth borosilicate glass.

12. The method of claim 9, wherein said glass layer comprises lead silicate glass.

13. The method of claim 9, wherein the rough coating comprises fluorine-doped tin oxide.

14. The method of claims 9, 10, 11, 12 or 13 wherein the transparent sheet comprises soda-lime glass.

15. The method of claim 8 which includes:

heating the glass layer at a first lower temperature to impart dimensional stability to said layer and;

heating the glass layer at a second higher temperature to harden said layer.

* * * * *